(12) United States Patent
Ehsani et al.

(10) Patent No.: US 9,324,327 B2
(45) Date of Patent: *Apr. 26, 2016

(54) SPOKEN CONTROL FOR USER CONSTRUCTION OF COMPLEX BEHAVIORS

(71) Applicant: NANT HOLDINGS IP, LLC, Culver City, CA (US)

(72) Inventors: Farzad Ehsani, Sunnyvale, CA (US); Silke Maren Witt-Ehsani, Sunnyvale, CA (US); Demitrios Master, Cupertino, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,878

(22) Filed: Apr. 23, 2015

(65) Prior Publication Data

US 2015/0228283 A1    Aug. 13, 2015

Related U.S. Application Data

(63) Continuation of application No. 13/780,645, filed on Feb. 28, 2013, now Pat. No. 9,026,441.

(60) Provisional application No. 61/604,873, filed on Feb. 29, 2012.

(51) Int. Cl.
*G10L 17/22* (2013.01)
*G10L 15/06* (2013.01)
*G06F 3/16* (2006.01)
*H04M 1/725* (2006.01)

(52) U.S. Cl.
CPC ............... *G10L 17/22* (2013.01); *G06F 3/167* (2013.01); *G10L 15/063* (2013.01); *H04M 1/72563* (2013.01); *H04M 1/72566* (2013.01); *H04M 1/72569* (2013.01); *H04M 1/72572* (2013.01); *H04M 2250/12* (2013.01); *H04M 2250/74* (2013.01)

(58) Field of Classification Search
CPC ... G06F 1/1647; G06F 1/1654; G06F 1/3218; G06F 21/554; G06F 2221/2111
USPC ............. 704/275; 726/22, 23, 24, 25; 705/39; 707/723; 706/14
See application file for complete search history.

(56) References Cited

U.S. PATENT DOCUMENTS

| 4,882,681 | A | 11/1989 | Brotz |
| 4,885,681 | A | 12/1989 | Umeno et al. |
| 5,818,733 | A | 10/1998 | Hyuga |
| 5,982,853 | A | 11/1999 | Liebermann |
| 6,397,267 | B1 | 5/2002 | Chong, Jr. |

(Continued)

OTHER PUBLICATIONS

Wallen, Jack, "Automate Your Motorola Razr With Smart Actions," TechRepublic, Jan. 17, 2012, downloaded at www.techrepublic.com/blog/smartphones/automate-your-motorola-razr-with-smart-actions/4215.

*Primary Examiner* — Charlotte M Baker
(74) *Attorney, Agent, or Firm* — Stetina Brunda Garred & Brucker

(57) ABSTRACT

A device interface system is presented. Contemplated device interfaces allow for construction of complex device behaviors by aggregating device functions. The behaviors are triggered based on conditions derived from environmental data about the device.

19 Claims, 9 Drawing Sheets

(56) References Cited

U.S. PATENT DOCUMENTS

| | | |
|---|---|---|
| 6,633,235 B1 | 10/2003 | Hsu et al. |
| 7,154,862 B2 | 12/2006 | Krzyzanowski |
| 7,302,394 B1 | 11/2007 | Baray et al. |
| 7,751,884 B2 | 7/2010 | Ternes et al. |
| 7,801,185 B2 | 9/2010 | Krzyzanowski |
| 7,957,321 B2 | 6/2011 | Krzyzanowski |
| 8,165,867 B1 | 4/2012 | Fish |
| 8,332,224 B2 | 12/2012 | Di Cristo et al. |
| 8,346,563 B1 | 1/2013 | Hjelm et al. |
| 2002/0069063 A1 | 6/2002 | Buchner et al. |
| 2002/0072921 A1 | 6/2002 | Boland et al. |
| 2003/0063072 A1 | 4/2003 | Brandenburg et al. |
| 2006/0028429 A1 | 2/2006 | Kanevsky et al. |
| 2006/0271520 A1 | 11/2006 | Ragan |
| 2007/0198663 A1 | 8/2007 | Helander |
| 2008/0174547 A1 | 7/2008 | Kanevsky et al. |
| 2009/0112832 A1 | 4/2009 | Kandogan et al. |
| 2009/0131165 A1 | 5/2009 | Buchner et al. |
| 2011/0161076 A1 | 6/2011 | Davis et al. |
| 2011/0254792 A1 | 10/2011 | Waters et al. |
| 2013/0031476 A1 | 1/2013 | Coin et al. |
| 2013/0218876 A1 | 8/2013 | Lonnfors et al. |

SPOKEN CONTROL FOR USER CONSTRUCTION OF COMPLEX BEHAVIORS

This application is a continuation of prior U.S. application Ser. No. 13/780,645 filed Feb. 28, 2013 which claims the benefit of priority to U.S. provisional application having serial number 61/604873, filed Feb. 29, 2012.

FIELD OF THE INVENTION

The field of the invention is device interface technologies.

BACKGROUND

As mobile computing technology becomes more ever-present in our daily lives, mobile device users become more and more reliant on functionality provided by their mobile devices. Ideally, mobile devices, or other computing devices, should allow users to specify complex behaviors. Allowing users to specify complex behaviors gives rise to customization of device actions with respect to different situations or conditions to better serve the user's needs.

An online article called "Automate your Motorola Razr with Smart Actions" by Jack Wallen, published Jan. 17, 2012 on TechRepublic.Com (see URL www.techrepublic.com/blog/smartphones/automate-your-motorola-razr-with-smart-actions/4215) describes the state of a configurable smart phone. The application on the device allows users to specify a number of complex behaviors by creating rules which may utilize the many basic functions of the device. For example, a user can create a rule that causes the device to be silenced based on its knowing a particular location (say home) and a particular time of day (say 6:00-7:00 pm). This application supports only touch-base controls and does not support technologies capable of making even simple rule creation totally effortless and intuitive such as through speech recognition or natural language processing. The technology cannot convert spoken input signals to create rules governing complex behaviors for the device to perform.

Others have put forth an effort toward offering user control of device behavior. One example includes U.S. patent application publication 2011/0254792 to Waters et al. titled "User Interface to Provide Enhanced Control of an Application Program", filed as an international application on Dec. 18, 2009. Waters merely focuses on providing support for touch-based controls rather than a natural multi-modal dialog interaction. Still another example includes U.S. Pat. No. 7,154,862 to Krzyzanowski titled "Device Control System, Method, and Apparatus for Server-Based or Peer-to-Peer Network Environments", filed Feb. 23, 2004. Krzyzanowski seeks to provide a unified interface via handheld devices. Still further, U.S. Pat. No. 7,302,394 to Baray et al. titled "Front-End Device Independence for Natural Interaction Platform", filed Dec. 20, 2002, contemplates providing a natural language interpretation system that provides commands to back end applications.

U.S. Pat. No. 8,346,563 B1 to David Hjelm, Robert Kriiger, Bjorn Giilsdorff, Ebba Birgitta Gustavii, and Maria Cheadle titled "System and methods for delivering advanced natural language interaction applications", patent date: Jan. 1, 2013 describes a system for delivering advanced natural language interaction applications, comprising a dialog interface module, a natural language interaction engine, a solution data repository component operating comprising at least one domain model, at least one language model, and a plurality of flow elements and rules for managing interactions with users, and an interface software module. Users submit requests via a network which are preprocessed by the dialog interface module and subsequently transmitted to the natural language interaction engine. Using language recognition rules stored in the solution data repository and the determined semantic meaning or user intent, the natural language interaction engine forms and delivers an appropriate response or makes an appropriate action based on the request. Hjelm et al. describe a generic approach to human-computer conversational dialog management. The work fails to distinguish a system responding in the sense of "executing an action" from system responding that entails complex device behavior. Hjelm et al. fails to address the creation or use of triggers in the creation of complex device behaviors. Additionally, the work does not discuss the creation of complex device behaviors from one or more function primitives.

U.S. Pat. No. 7,751,884 B2 to David Ternes, Dong M. Birkholz, David W. Yost, and James A. Esler titled "Flexible Neural Stimulation Engine" issued Jul. 6, 2010 regards an implantable medical pacemaker device that monitors device state and the previous behavior of the device relative to state. Input to the device affects device state which, in turn, can cause the device to take action based upon the change in device state and neural event timers. Ternes et al. makes some progress regarding the monitoring of device state and taking an action as a consequence of the state of the device. Ternes et al.; however, fails to distinguish a reactive action from a complex behavior. Ternes et al. do not disclose to any method for the creation of and use of triggers in the creation and performance of complex device behaviors constructed from function primitives. Additionally, the work fails to describe any application of the methods to additional problem domains.

U.S. Patent Publication Number US 2011/0161076 A1 to Bruce L. Davis, Tony F. Rodriguez, William Y. Conwell and Geoffrey B. Rhoads titled "Intuitive Computing Methods and Systems" published Jun. 30, 2011 describes a smart phone configured to sense audio, imagery or other stimulus data of its user's environment. Based upon such input, the system can act autonomously in accordance with or fulfillment of the inferred desires of the user. Davis et al. make progress in methods to determine user intent and enabling autonomous reaction to user input. Additionally, Davis et al. describe progress in the use of phone sensors to determine device state and subsequently tailor device behaviors or trigger an action. Davis et al. fails to address however reactions that constitutes complex device behaviors. They further fail to describe the creation and use of triggers in the creation and performance of complex device behaviors constructed from function primitives.

U.S. Patent Publication Number US 2009/0112832 A1 to Eser Kandogan, Jie Lu and Michelle Xue Zhou titled "Intelligent Content Assistance" published Apr. 30, 2009 describes a method for generating one or more context-sensitive content recommendations by detecting the information needs of a user, retrieving one or more content-recommendation templates that match the detected information needs and instantiating the retrieved templates with one or more parameter values to generate recommended contents. The system generates these recommendations during business processes. It dynamically monitors and detects the needs of a user in a particular context. Additionally, it retrieves content-recommendation templates that appear to match the information needs of the user, instantiating them using information from user input, context, interaction history, system-learned query and content models and external sources. Context, interaction history and system-learned models are updated dynamically for learning and adaptation. Kandogan et al. makes some progress toward using environmental, situational or contextual factors in the detection of the information needs of a user. The work further advances the retrieval of content recommendation templates that appear to match the information needs of the user. Kandogan et al. additionally makes progress in regards to the use of context, interaction history, system learned models and content models domains in the determination of system responses. Kandogan et al. however lacks insight with respect to any complex device behavior. Kandogan et al. further fail to describe the creation and use of triggers in the creation and performance of complex device behaviors constructed from function primitives.

U.S. Pat. No. 8,332,224 B2 to Philippe Di Cristo, Chris Weider and Robert A. Kennewick titled "System and Method of Supporting Adaptive Misrecognition Conversational Speech" issued Dec. 11, 2012 describes a system and methods that support multimodal input including natural language speech input. The system interprets spoken utterances or other received non-spoken inputs using a conversational interface that includes a conversational speech analyzer, a general cognitive model, an environmental model, and a personalized cognitive model to determine context, domain knowledge, and invoke prior information. The system does not address sensor data or the functional states of a device. The system creates, stores and uses extensive personal profile information for each user, thereby improving the reliability of determining the context of the speech or non-speech communication and presenting the expected results for a particular question or command. Cristo et al. exhibit progress regarding the use of a personalized cognitive model in determining the context of speech and non-speech communication. The Cristo et al. system does not address sensor data or the functional states of a device however. Cristo et al. also fails to address the conversion of signals to complex device behavior. Cristo et al. also fails to address the creation and use of triggers in the creation and performance of complex device behaviors constructed from function primitives.

U.S. Patent Publication Number US 2013/0031476 A1 to Emmett Coin, Deborah Dahl and Richard Mandelbaum titled "Voice Activated Virtual Assistant" published Jan. 31, 2013 describes a multimodal conversational interface that interprets spoken natural language utterances, visual cues, images and/or other forms of input. The system includes a conversation manager that relies on a set of functions defining very flexible adaptive scripts. During interaction with a user, the conversation manager obtains information from the user, refining or defining more accurately what information is required by the user, asking the user for additional information to determine the user's intent. User responses result in the selection of scripts or subscripts relevant to subsequent actions. The system may obtain additional data relevant to the dialog from local sensors or remotely from other sources during an interaction. Remote sources are accessed by activation of an appropriate function such as a search engine. Coin et al. make progress regarding the interactive determination of user intent, the selection of script or subscripts that are relevant to subsequent behaviors and the use of sensor data. Coin et al. however fail to provide insight into the creation of complex device behaviors. Coin et al. however fail to provide insight into the creation of complex device behaviors. Coin et al. also fails to address the creation and use of triggers in the creation and performance of complex device behaviors constructed from function primitives.

These references fail to provide insight into how users can be enabled to construct complex device behaviors based on natural interactions with a device environment, especially in a context where previous interactions can affect future device states. Furthermore, the references fail to provide any insight into using primitives to instantiate a future device behavior. There thus remains a need for systems and methods that address both the conversion of signals to complex device behavior and creating and using triggers for complex device behavior from function primitives.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, with the difficulty of using graphical interfaces, particularly on small devices with limited display area, the increase need for effective assistant behaviors on computing devices, and the greater power and flexibility of spoken interfaces, there is still a need for a spoken method for user creation of complex behaviors.

SUMMARY OF THE INVENTION

The inventive subject matter provides apparatus, systems and methods in which allow a user to interact with a computing device, possibly a cell phone, by speaking and creating complex behaviors for that computing device, that would provide more effective, assistant like behavior tailored to that user's needs. One aspect of the inventive subject matter includes a device interface, preferably a mobile device interface, which allows a user to construct complex device behaviors based on historical interactions. Contemplated interfaces include a dialog interface module that can capture a digital representation of a spoken utterance from a user. Preferably the digital representation includes a signal having one or more derivable characteristics (e.g., tone, words, tokens, frequency, modulation, envelop, touch, temperature, gestures, images, physical location, speed, etc.). The device interface can also include one or more connections to data sources through which the device interface can obtain information related to the device's environment. Preferably, the device interface also includes an interaction history database storing data objects representing past interactions between the user and the device, possibly based on multiple modalities or previously executed device functions. Still further, the device interface can comprise a triggering module coupled with the various components of the device interface. The module can configure to generate a trigger that causes the device to take one or more actions giving rise to complex behaviors. For example, the triggering module can convert the signal, possibly based on characteristics derived from the signal, to one or more device behaviors. The triggering module can further create a trigger based on the device behaviors and device state derived from the data sources. Once the trigger conditions have been met, the device can be configured to execute the device behaviors.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
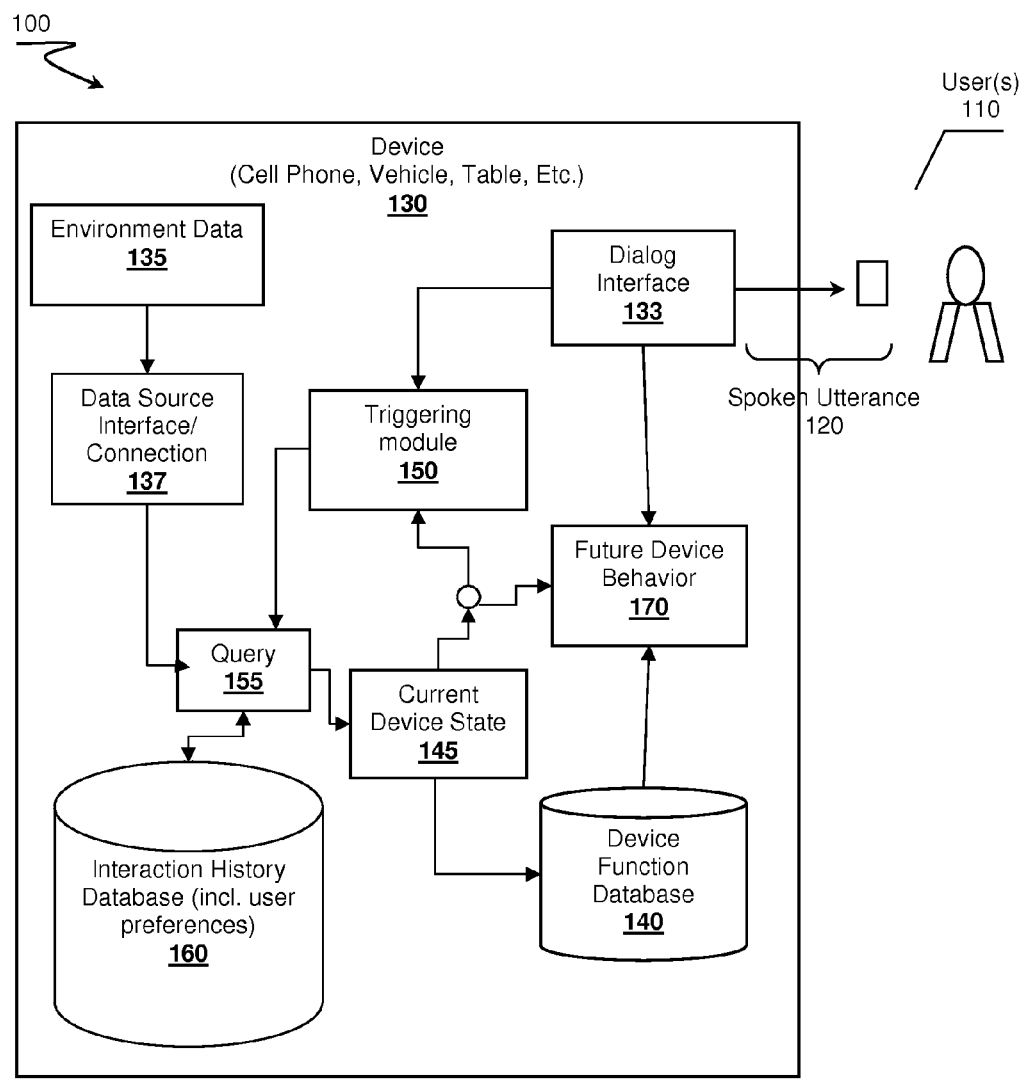
FIG. 1 provides an overview of an ecosystem where a future device state can be triggered based on observations of interactions.

It should be noted that while the following description is drawn to a computer/server based device interaction systems, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including providing an infrastructure capable of generating one or more signals that configure a mobile device to present possible interactions for a user that might be of interest.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, "coupled to" and "coupled with" are construed to mean "communicatively coupled with" in a networking context.

The inventive subject matter is considered to include a spoken dialog device interface architecture with models to support interactions for the creation of complex device behaviors, support for execution of the complex behaviors and coupling with a variety of databases, sensor data, or other information data sources associated with the device, or with applications on the device or accessible through the device. Interactions to create behaviors could include simple commands or more complex dialog interactions, possibly multi-modal interactions, with the device in order to specify the desired behaviors. One should further appreciate that a dialog can comprise representations of communication modalities beyond spoken utterances as well. For example, an input signal can be analyzed to derive characteristics of spoken utterances (e.g., words, tokens, syntax, modulation, frequency, tones, accents, etc.), haptic data, tactile data, temperature data, motion data, location data, or other types of sensor data that can be associated with a dialog interaction.

FIG. 1 presents an overview of an ecosystem that can be located on a computing device 130, preferably a mobile device functioning as a virtual assistant. The mobile device 130 preferably includes a smart phone or could include a tablet, a computer, an appliance, a consumer electronic device, a vehicle, or other types of devices. The device 130 processes spoken input represented by spoken utterances 120 from a user 110 and allows the user 110 to create, through spoken dialog interaction with the device 130, a customized, complex future behavior 170 for the device 130.

Utterances 120 can be converted to signals, which in turn can be analyzed to derive signal characteristics reflecting the properties of the utterances. For example, the signal characteristics (e.g., wave forms, envelops, frequencies, tone, etc.) can be mapped to one or more words, concepts, or other types of objects. One aspect of the inventive subject matter includes a dialog interface that interprets user utterances 120 in the context of possible functions, behaviors, or trigger conditions for the device 130. This is achieved by processing the incoming spoken utterance 120 with the dialog interface 133. The interpretation comprises of a set of key value pairs and an identifier of the concept related to the request. This interpretation is sent on to the triggering module 150. For example, an utterance such as 'please remind me to call my mother when I get home', can be mapped to 'action=reminder, function=phone call, phone number=mother, location='home'. Additionally, inputs from other modalities such as touch, text, gesture etc. are likewise mapped to key/value pairs via the dialog interface 133.

Triggering module 150 finds one or more possible matches between the key/value pairs and primitive device functions stored in the device function database 140. The set of possible primitive functions depends on the capabilities of a particular device 130 and stored in the device function database 140. The triggering module 150 checks if the incoming utterance 120 has sufficient information to create a new future behavior. A future behavior 170 can be created when there is at least one action, one primitive function (e.g. location) and a trigger condition available. Generally, the complex behavior may have one or more actions, and zero or more conditional triggers for those actions. If there is not sufficient information, the triggering module 150 will send this information to the dialog interface 133 which in turn will construct a question to the user 110 regarding the missing information.

A possible technique to determine if sufficient information is available, is for the triggering module 150 to create a query 155 based on the current set of environment data 135 to the interaction history database 160 to retrieve previous interactions. This is described in more detail in FIG. 2.

Figure 2:
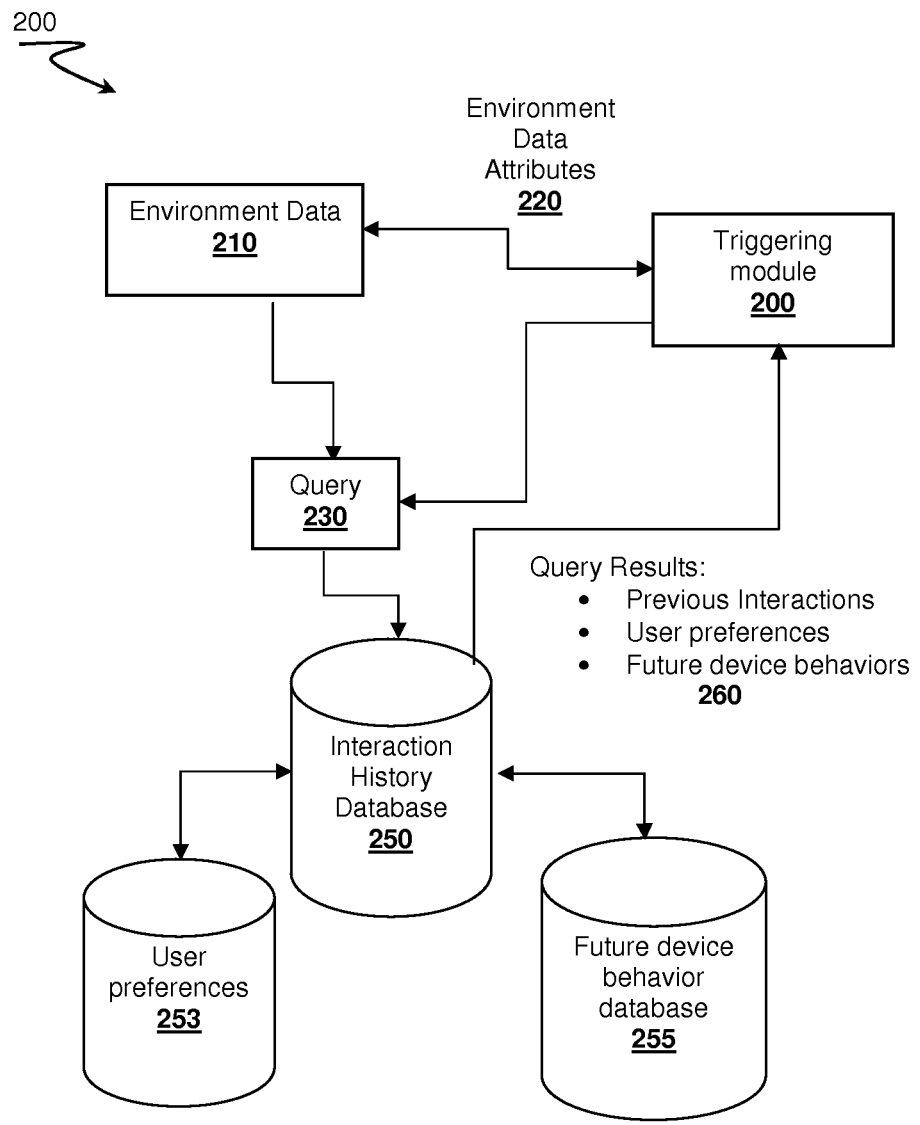
FIG. 2 illustrates construction of a query to the interaction history database based on environment data attributes.

In FIG. 2, the triggering module 200 first requests the current set of environment data attributes 220. Based on both the current key value pairs of the user input and the retrieved environment data attributes 220, the triggering module assembles a query 230 to the interaction history database 250 in order to attempt to resolve missing pieces of information that are required to create the requested future behavior, such as the phone number or location in the example above. The interaction history database 250 passes on the query 230 to the user preferences database 253 and to the future device behavior database 255. The combined results 260 from all three databases are then returned to the triggering module 200, which in turn evaluates the results and updates the key value sets accordingly. A different variation of the query creation entails using the signature of the current device state in order to find similar previous interactions with similar device state signatures.

Referring back to FIG. 1, contemplated systems 100 would access information related to one or more users 110 such as the interaction history database 160 storing information about previous user interactions, databases of calendar events, contact lists, user preferences or any other databases of relevant information available from the device 130. In the contemplated systems 100, Internet search or other interactions with a network site would be both a possible action as part of a behavior, or a possible data source of conditional trigger information. In response to the user utterances 120 and descriptions of complex behavior, the system would represent the sequence of simple actions with associated conditions or triggers and send messages to the appropriate applications or device functions when the execution conditions for the complex behavior were met.

The interaction history database 160 stores information about prior interactions and is used to support the natural flow of the current dialog interaction or to supply information about past user behavior, past device behavior, or past device functions that could be relevant to complex behaviors or trigger conditions. Additionally, the interaction history database 160 also includes information about the user's preferences. This information is also utilized to resolve ambiguities or unknown values. In the example above 'please remind me to call my mother when I get home', the values for "phone number=mother" and "location=home" could be resolved via the user preferences to the mother's phone number and the GPS location values for the home address of the user.

Additionally, the interaction history database 160 can store information related to past interactions with the device 130, the environment, the user 110, or other factors. For example, historical interactions could include one or more previously constructed device behaviors comprising one or more device functions, which can be used as an example for future device behaviors. The parameters governing the actions taken by a device 130 for a previous device behavior can be altered to conform with the needs for a current or future device behaviors.

The environment data 135 is being made available via the data source interface 137. In addition to local environment data 135 inherent to the device 130, the data source interface 137 makes a variety of information sources available communication, for example with the World Wide Web. The data sources can be located anywhere as long as they can be communicatively coupled to the data source interface 137. For example, a data source could include a data source internal to the device 130 itself; one or more applications, or the device operating system. Further, the data sources can be external to the device, possibly accessible over a network data source connection (e.g., LAN, WAN, Wi-Fi, the Internet, cell network, GPS, accelerometer, external sensors, etc.). Example external data sources can include various network sites: web sites, news sites, radio or television stations, etc.

Figure 3:
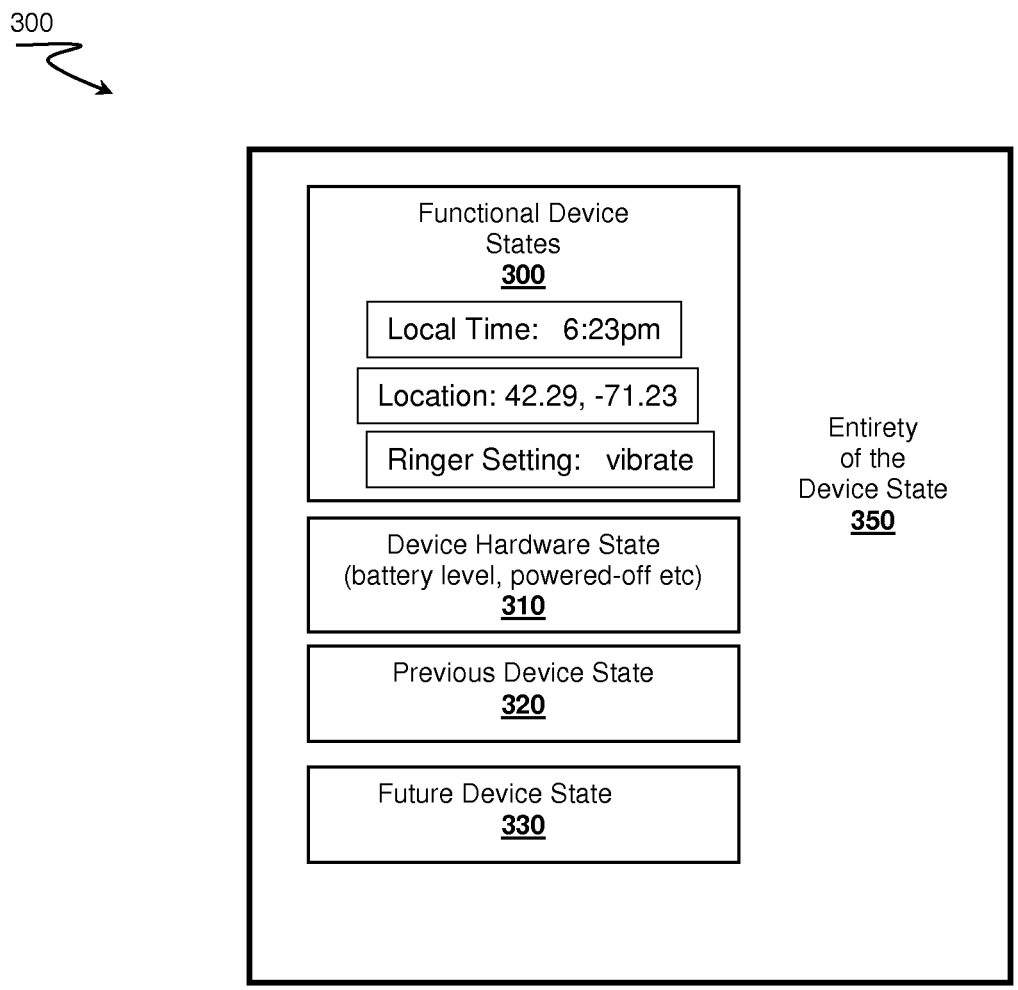
FIG. 3 illustrates an example of a device state.

In addition to accessing the environment and interaction history data, the triggering module 150 also accesses the current device state 145 and its associated values for the set of primitive device functions. The combined set of values for all the primitive device functions can be seen as a state signature. Moreover, the device state has a temporal aspect: there always exists a past, current and future device state. An illustration of this can be seen in FIG. 3, which presents a possible example of a device state. The entirety of the device state 350 includes the sum of functional device states 300 such as the current local time, location, device settings such as ringer mode, ringer volume, or other attributes. Next, there is the device hardware state 310, which comprises of the current values for functions such as battery level, powered status etc. The device state also tracks past device states 320 and projects future device states 330. The device state is updated at frequent and regular time intervals. For example, the device state may be updated every minute and each time there are changes in the status of the primitive functions, i.e. each time the device's location changes by more than x feet etc.

Again referring back to FIG. 1, in some embodiments, the contemplated system can comprise a device function database 140 (e.g., a listing of functions that are device independent, functions that are device-specific, device primitives, etc.). The database 140 could be indexed by the characteristics of the input signal (e.g., utterance 120) via the triggering module 150. If the signal includes a word that maps to "reservation", or a "reservation concept", then the "reservation" concept can be used as a query to obtain related device functions for making a reservation (e.g., returning pointers to a calendar application, return I/O options for seeking additional user input, etc.). The returned functions can then be aggregated to form a corresponding complex behavior: making a reservation by (a) query for additional input from a user 110, (b) interfacing to calendaring program, (c) seeking previous interactions indicating preferences for the type of reservation, or other device actions. The device behaviors can also be constructed based on known or previously executed device functions, possibly obtained from the interaction history database.

Moreover, any device function or device state 145 of the device and any information accessible through the device 130 would be available to the speech-based behavior creation as a possible action to be taken or a condition or trigger including email, location information, calendar functions, reminders, turning the device on and off, the state of the device's battery, prior interactions, user preferences, volume settings, entertainment functions such as playing music or viewing video, internet search, camera functions, social networking functions, or use of applications on the device.

Figure 4:
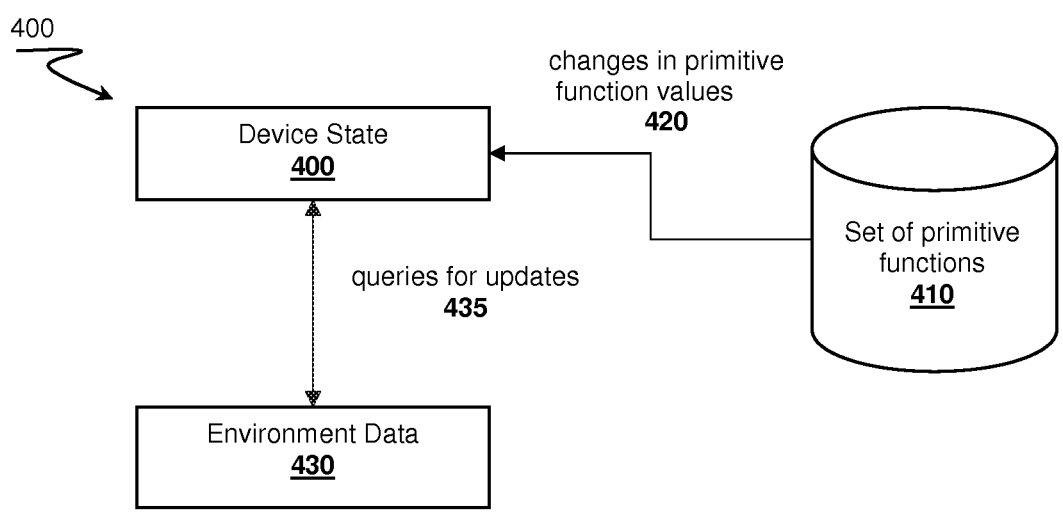
FIG. 4 illustrates how a device state maps to device function primitives.

FIG. 4 shows how this device state is updated from two main information sources. The set of primitive functions 410 sends an update 420 to the device state 400 each time there is a change in one of the values of the primitive functions. Additionally, each time the device state is queried by the triggering module, the device state in turn queries the environment data 430 for updates 435.

Figure 5:
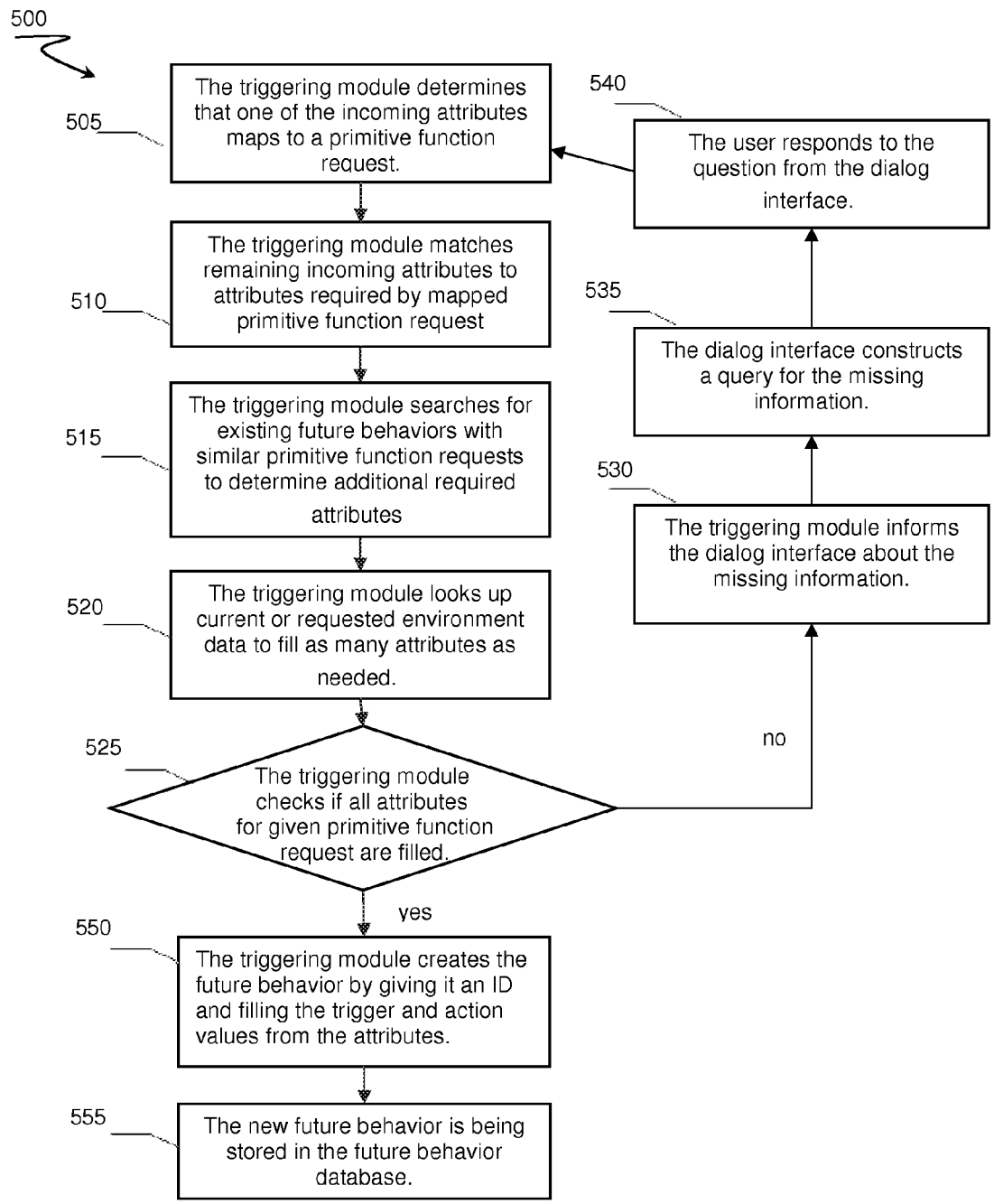
FIG. 5 illustrates the construction of future device behaviors.

FIG. 5 illustrates a method 500 for the construction of a future behavior. First, at step 505, the triggering module evaluates the user-provided key value pairs or attributes and at step 510 determines if one of the incoming key value pairs matches a primitive function request. Each available primitive function of a system has always one or more primitive function request associated with them. Additionally, primitive function requests can have one or more attributes. For example, to turn on the heat at home one associated attributes might be the turn-on time. Then, the triggering module searches the database of existing future behaviors with similar request types for other possible attributes or triggers at step 515. Following this, the triggering module looks up the related environment data and interaction history as discussed above to fill any many attributes internally as possible at step 520. Next, the triggering module determines if enough information is available to create a future behavior as illustrated by conditional step 525. If yes, the triggering module assembles a complete set of triggers and actions, and a new future behavior is created where both the triggers and actions include a combination of values for the involved primitive functions at step 550. Note that a future behavior also can include a combination of several primitive function requests if that is what the user specified. For example, "every time I come home, turn on the heat and the kitchen light". The combination can be of any type ranging from a weighted sum to a filtered or ranked combination based on previous use in prior similar states. The device is then configured to exhibit this respective new future behavior once its trigger is fulfilled as well as storing this behavior in the future behavior database as indicated by step 555. In summary, the triggering module can construct a complex behavior by aggregating device functions from the primitives together where the device behavior seeks to alter the device state (e.g., a future state, future configuration, current state, current configuration, etc.). The device behaviors can also be constructed based on known or previously executed device functions, possibly obtained from the interaction history database.

If the triggering module at step 525 lacks complete information, then at step 530 the triggering module can inform the dialog interface about the missing information. In response, at step 535 the dialog interface can construct a query for the missing information, which can then be presented to the user. Step 540 can include receiving a user response to a question based on the query where the user response can be fed back into the method at step 505.

Again referring back to FIG. 1, the device function database 160 could also be indexed by the device state so that only valid functions with respect to the device state are returned. One should appreciate that a device state can include a previous device state, a current device state, or even a future device state where the device state can be derived from one or more data sources. For example, contemplated device interfaces can include one or more data source connections that allow the device to acquire environment data representative of the device's environment from the data sources. The environment data 135, or even previous interactions, can be used to derive the device state 145 by comparing values or parameters from the environment data to parameters associated with known device states. It should be further appreciated that the device state can also reflect a functional state of the device or even a hardware state of the device.

Figure 6:
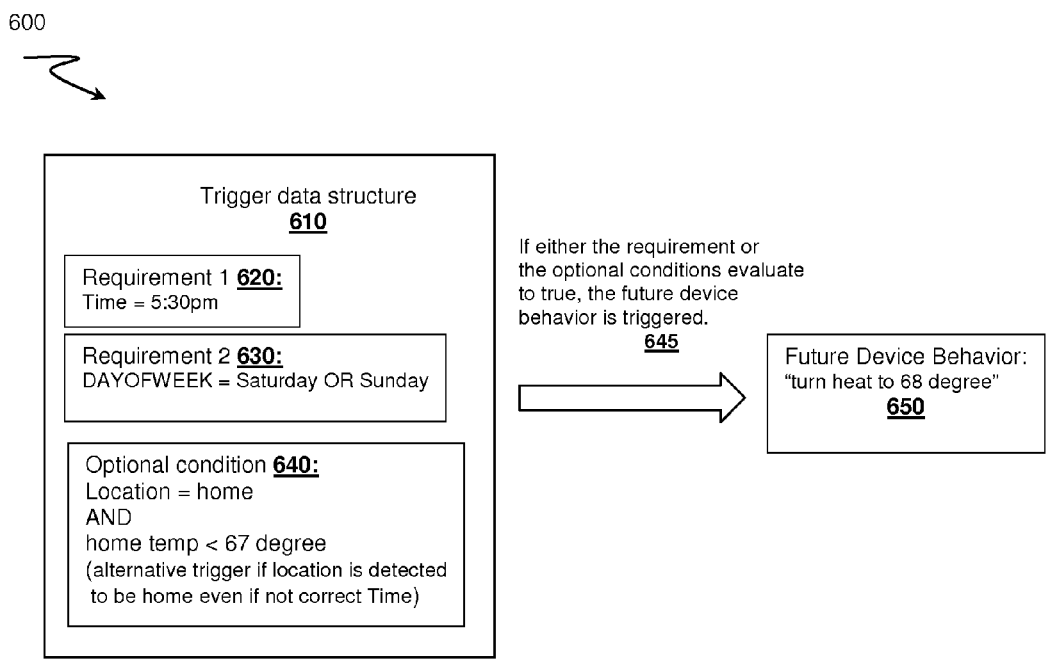
FIG. 6 illustrates a possible trigger that can cause a device to exhibit a future behavior.

Device behaviors are not necessarily executed upon creation. In view that a device behavior can, and most likely will, affect the device's state, the behavior should be executed once a satisfactory triggering condition has been met. A triggering module can combine the information learned thus far and also create a trigger indicating when a device behavior should be exhibited. The trigger can be built based the desired behavior or the device state. FIG. 6 shows an example trigger data structure 610. This data structure contains two requirements 620 and 630 and one optional condition 640. A requirement is defined as the primary trigger and thus all always evaluated first. In this example, every time the current time is 5:30 pm OR if it is the weekend, the future device behavior 650 should be triggered 645. An optional condition is defined as an alternative trigger that can trigger the future device behavior 650 even if the primary trigger does not evaluate to true. In this example, the optional condition covers the case when the user is at home during a weekday and the home temperature drops below 67 degrees.

In some cases the trigger condition might indicate the device behavior should be exhibited immediately in order to achieve a desired future device state as soon as possible. In other cases, the desired behavior will only be exhibited once a future device state is achieved. Thus, a trigger is considered to include rules, requirements, optional conditions, or other criteria allowing the trigger to be satisfied according to different factors. The trigger can further include time dependency where the trigger is satisfied substantially in real-time or where the trigger depends on a future state. In other words, a trigger does not necessarily have to be satisfied at the time of creation.

Figure 7:
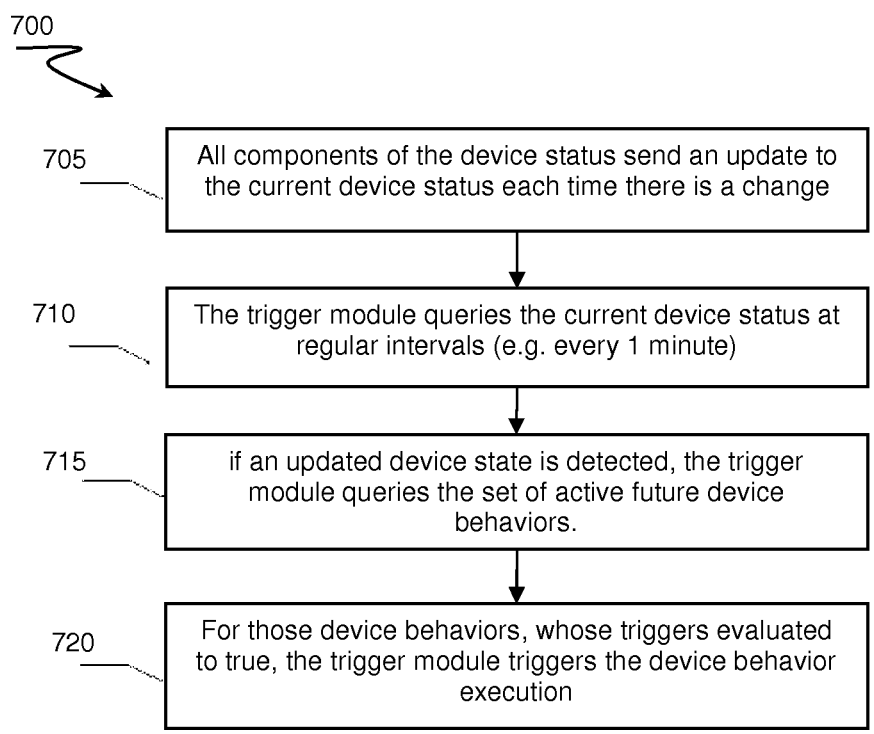
FIG. 7 shows a methods of triggering a future device behavior

FIG. 7 illustrates the method 700 of triggering a future device behavior. At step 705, All sensors and other components that contribute to the device status as discussed above are programmed to send a status update to the device state each time there is a change. Since not all components can be programmed to send updates upon the occurrence of a change, the trigger module additionally always queries the current device status at regular time intervals, for example every 1 minute, as indicated by step 710. At step 715, if any change has been detected in the device status, the trigger module will query the set of active future device behaviors. If there are one or more of these future device behaviors that the trigger evaluates to be true, the trigger module will execute, at step 720, the behavior in the sequence matching their priorities.

An astute reader will appreciate that the disclosed systems or interfaces give rise to complex behaviors through leveraging past knowledge or future desired device states. The system can determine a desirable device state with respect to its environment, and then seek one or more state paths from the device's current state to the final desirable device state. The paths can be built from a series of states and device functions or behaviors that alter a current state of the device until a goal state is achieved. Further, the trigger for each function or behavior can be managed so that the user's interactions with the device have the greatest chance of success. A device interface can construct a queue of device behaviors where the queue aids configuring the device at appropriate times or circumstances to execute corresponding functions when triggering criteria are met.

Figure 8:
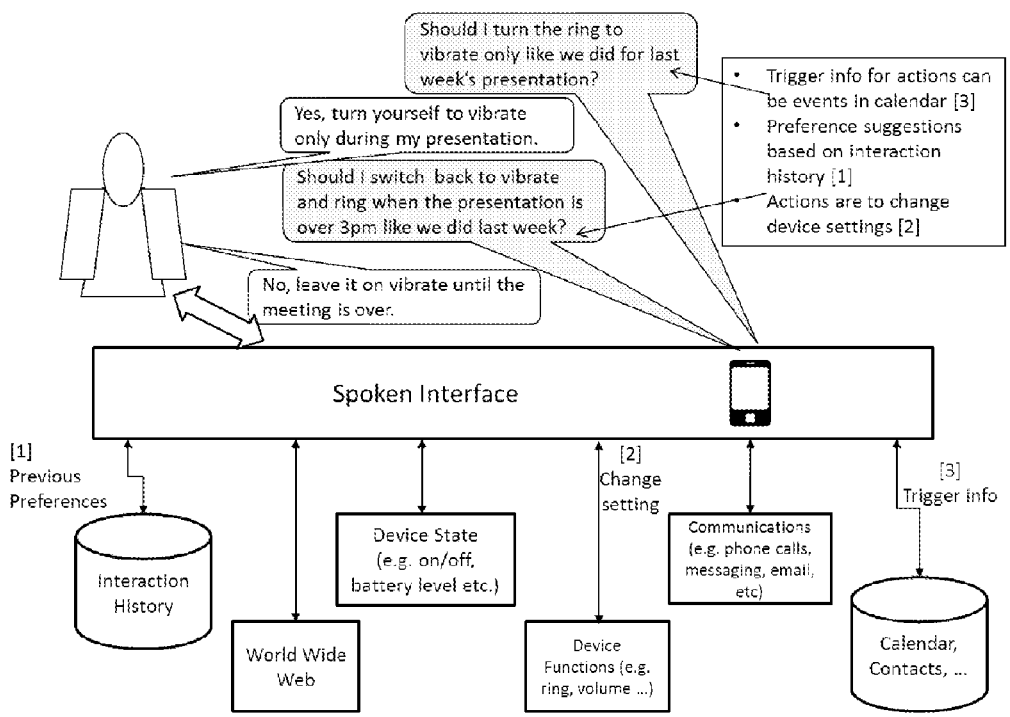
FIG. 8 shows a schematic of the spoken dialog interface interacting with the user to create complex behavior involving control of the ring triggered on calendar information.

As a use-case consider a scenario where a user wants to create a complex behavior on a mobile phone (operating as a virtual assistant). Suppose, as shown in FIG. 8, the user says "Don't interrupt me during my presentation today". The spoken dialog interface for creating complex commands would process and interpret the user's utterance using information from the calendar database, and the interaction history database to produce the response "Should I set the ring to vibrate only like we did for last week's presentation?". When the user responds "Yes" the system would use calendar information to find the start time of the presentation and store a delayed action to send a message to the device in order to set the ring to vibrate only, starting at that time. The execution component of the system would then send the message at the designated start time to change the ring setting. The system might then ask, based on interaction history and calendar information, "should I switch back to vibrate and ring when the presentation is over at 3 pm the way we did last week?" Suppose the user responds, "No leave it on vibrate until the meeting is over", using information from the calendar, the system stores a command to send a message to the phone at the meeting end time that will set the ring to the user's usual setting of ring and vibrate. To continue the example, suppose later that day but before the presentation the user says "Let me know right away if Maya is trying to contact me." Using information in the user's contact list to identify Maya, the system sends message (s) to the device to, for example, make the phone ring loudly, vibrate and flash on the screen if an email, text or phone call is received from Maya. Given the interaction history and the stored actions the system would identify a potential conflict in instructions and ask "Should I notify you during the presentation if Maya calls?" The system coordinates information from various sources to make construction of complex behaviors faster and more successful for the user. For the contemplated systems the component actions for the complex behaviors or trigger conditions would be limited only by the capabilities of the device and the available data sources.

Figure 9:
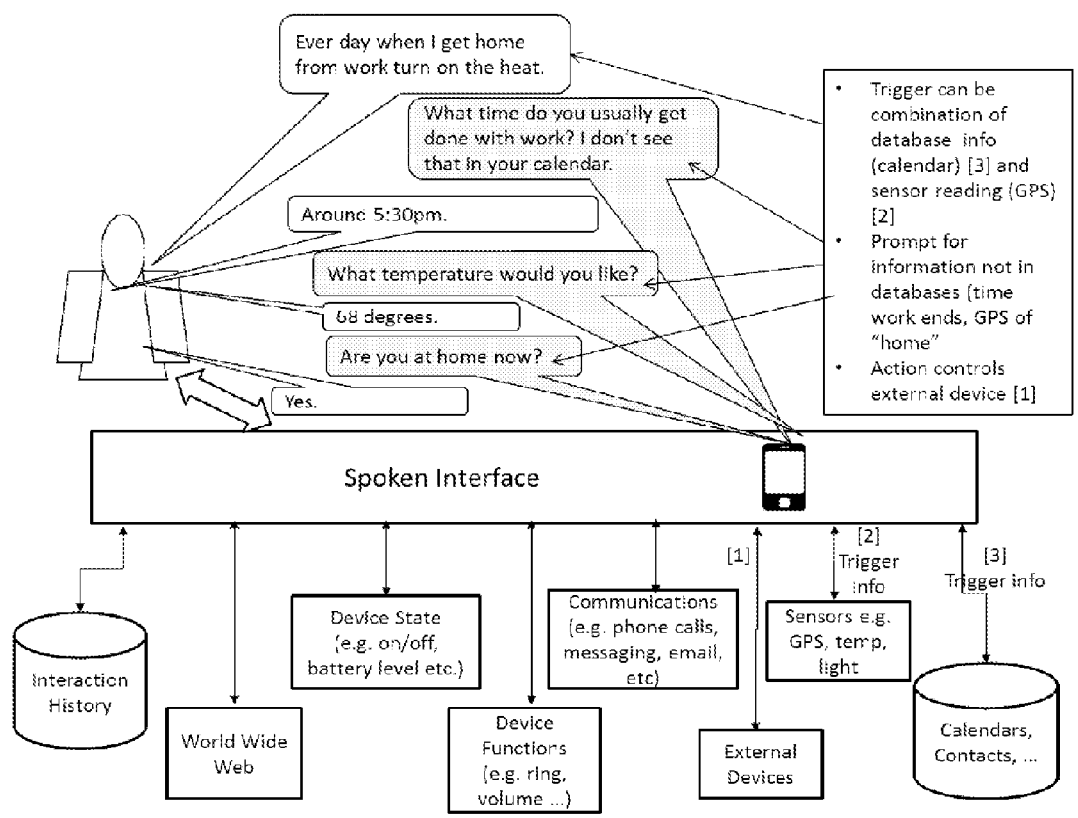
FIG. 9 shows a schematic of the spoken dialog interface interacting with the user to create complex behavior involving control of an external device triggered on calendar and location information.

As another use case scenario, FIG. 9 depicts a user initiating an interaction. The user wishes to establish the complex and conditional behavior of adjusting the heat system thermostat when he gets "home from work". The system, not possessing information in the user's calendar data source must obtain additional information in order to clarify how to perform the complex behavior. The system asks the user what time the user is typically finished with work to which the user replies, "5:30 pm". At this point in the interaction, the system still requires two additional pieces of information in order to trigger the complex behavior, neither of which is in the associated databases. The system first asks what temperature the user would like the thermostat to be set to. Finally, the system needs to clarify the meaning of "home" relative to a GPS reading. The system, knowing its own location, asks the user if he is currently "at home". When the user responds, "Yes", the system has all the information it needs to create and trigger the complex device behavior.

One should appreciate that a device behavior represents how the device presents itself as a useful device to the user rather than merely a collection of functions. For example, the device behavior not only includes taking actions, but could also include the manner in which it takes action. Thus, device behavior can be considered to include a kind of "device attitude" of sorts. Further the behavior can take on characteristics that reflect a user's desired manner of interacting with device. Some users might enjoy engaging with many detailed device features while other users might enjoy engaging with less features. Therefore, each device could exhibit different behaviors while accomplishing the same tasks.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . . and N, the text should be interpreted as requiring only one element from the group, not A plus N, or B plus N, etc.

What is claimed is:

1. A virtual assistant device comprising:
    a memory;
    at least one processor;
    a dialog interface including at least one sensor and configured to:
        accept a digital representation of a dialog interaction with a user via the at least sensor; and
        derive an interpretation of the dialog interaction from signal characteristics of the digital representation; and
    a behavior triggering module comprising software instruction stored in the memory and that configures the at least one processor to:
        receive the interpretation from the dialog interface;
        determine if the interpretation from dialog interface has sufficient information to construct a future device behavior;
        instruct the dialog interface to construct a query to be presented to the user to collect additional information when it is determined that the interpretation does not have sufficient information;
        identify a set of primitive device functions from a device function database based on the interpretation;
        construct a future device behavior from the set of primitive device functions and the interpretation;
        generate a trigger for the future device behavior as a function of the future device behavior and a device state associated with a target device;
        query the device state associated with a target device to determine satisfaction of the trigger; and
        configure the target device to exhibit the future device behavior upon satisfaction of the trigger.

2. The device of claim 1, wherein the digital representation comprises a representation of a spoken utterance.

3. The device of claim 2, wherein the digital representation comprise at least one of the following representations from the spoken utterance: a word, a token, a syntax, a modulation, a frequency, a tone, and an accent.

4. The device of claim 1, wherein the digital representation comprises a representation of at least one of the following input signals: haptic data, tactile data, motion data, gesture data, and location data.

5. The device of claim 1, wherein the interpretation comprises a set of key-value pairs.

6. The device of claim 1, wherein the interpretation comprises a concept identifier.

7. The device of claim 1, wherein the behavior triggering module further configures the processor to:
    identify missing pieces of information with respect to the future device behavior; and
    cause the dialog interface to construct a query for the missing pieces of information from the user.

8. The device of claim 1, wherein the trigger comprises a primary trigger.

9. The device of claim 1, wherein the trigger comprises an optional condition.

10. The device of claim 1, wherein the behavior triggering module further configures the processor to query the device state at regular time intervals.

11. The device of claim 1, wherein the device state comprises a past device state.

12. The device of claim 1, wherein the device state comprises a further device state.

13. The device of claim 1, wherein the device state includes at least one of the following at attributes: a location, a time, a battery level, a ringer mode, a ringer volume, a device environment attribute, a temperature, and a change in location.

14. The device of claim 1, wherein the future device behavior is a member of a queue of device behaviors.

15. The device of claim 1, further comprising a cell phone that includes the memory, the at least one processor, the dialog interface, and the behavior triggering module.

16. The device of claim 1, further comprising a server that includes the memory, the at least one processor, the dialog interface, and the behavior triggering module.

17. The device of claim 1, wherein the future device behavior comprises at least one of the following: a device command, a reservation, a temperature change, and a multimodal interaction.

18. The device of claim 1, wherein the behavior triggering module further configures the processor to resolve ambiguities of a future device behavior based on an interaction history stored in an interaction history database.

19. The device of claim 1, wherein the target device comprises the virtual assistant device.

\* \* \* \* \*